(12) United States Patent
Hou

(10) Patent No.: US 8,025,270 B2
(45) Date of Patent: Sep. 27, 2011

(54) DECORATIVE HUMIDIFIER

(76) Inventor: Jack Hou, Sterling, VA (US)

( * ) Notice: Subject to any disclaimer, the term of this patent is extended or adjusted under 35 U.S.C. 154(b) by 842 days.

(21) Appl. No.: 12/078,815

(22) Filed: Apr. 7, 2008

(65) Prior Publication Data

US 2009/0208379 A1    Aug. 20, 2009

(51) Int. Cl.
*B01F 3/04* (2006.01)
(52) U.S. Cl. ........ 261/26; 261/30; 261/78.2; 261/119.1; 261/142; 261/DIG. 65
(58) Field of Classification Search .................. 261/26, 261/30, 119.1, 78.2, DIG. 65, 142, 141
See application file for complete search history.

(56) References Cited

U.S. PATENT DOCUMENTS

| | | |
|---|---|---|
| 3,914,349 A | 10/1975 | Stipanuk |
| 4,064,203 A | 12/1977 | Cox |
| 4,117,045 A | 9/1978 | Henke et al. |
| 4,708,639 A | 11/1987 | Momose et al. |
| 4,749,389 A | 6/1988 | Worwag |
| 4,852,283 A | 8/1989 | Teng |
| 4,864,879 A | 9/1989 | Hou |
| 4,890,828 A | 1/1990 | Hou |
| 4,925,182 A | 5/1990 | Hou |
| 4,939,944 A | 7/1990 | Hou |
| 4,961,276 A | 10/1990 | Lin |
| 4,977,756 A | 12/1990 | Brock |
| 4,985,883 A | 1/1991 | Hou |
| 4,987,787 A | 1/1991 | Hou |
| 4,995,845 A | 2/1991 | Hou |
| 5,006,414 A | 4/1991 | Pond, Sr. |
| 5,018,288 A | 5/1991 | Yang |
| 5,020,409 A | 6/1991 | Hou |
| 5,070,633 A | 12/1991 | Liu |
| 5,070,753 A | 12/1991 | Hou |
| 5,078,386 A | 1/1992 | Hou et al. |
| 5,081,899 A | 1/1992 | Hou et al. |
| 5,088,373 A | 2/1992 | Hou |
| 5,090,144 A | 2/1992 | Liu |
| 5,110,636 A | 5/1992 | Hou |
| 5,131,175 A | 7/1992 | Liu |
| 5,163,878 A | 11/1992 | Hou et al. |
| 5,203,743 A | 4/1993 | Hou et al. |
| 5,286,535 A | 2/1994 | Hou |
| 5,338,583 A | 8/1994 | Hou |
| 5,412,889 A | 5/1995 | Hou |
| 5,448,007 A | 9/1995 | Hou |
| 5,508,022 A | 4/1996 | Clement et al. |
| 5,864,976 A | 2/1999 | Yang |
| 6,185,849 B1 | 2/2001 | Liu |
| 6,241,255 B1 | 6/2001 | Fang |
| 6,523,287 B1 | 2/2003 | Lee |
| 6,568,107 B2 | 5/2003 | Yuen |
| 6,978,564 B2 | 12/2005 | Hou |
| 7,040,950 B1 | 5/2006 | Chen |
| 7,441,756 B2 * | 10/2008 | Niedermann et al. ..... 261/119.1 |

* cited by examiner

*Primary Examiner* — Robert A Hopkins

(57) ABSTRACT

A decorative humidifier which has mainly a base seat, a water receptacle device for transforming water into vapor, a fan installed under the base seat, a water opening on the bottom of the water receptacle, a power source, a shaft connected with the power source for connecting to a decoration.

17 Claims, 18 Drawing Sheets

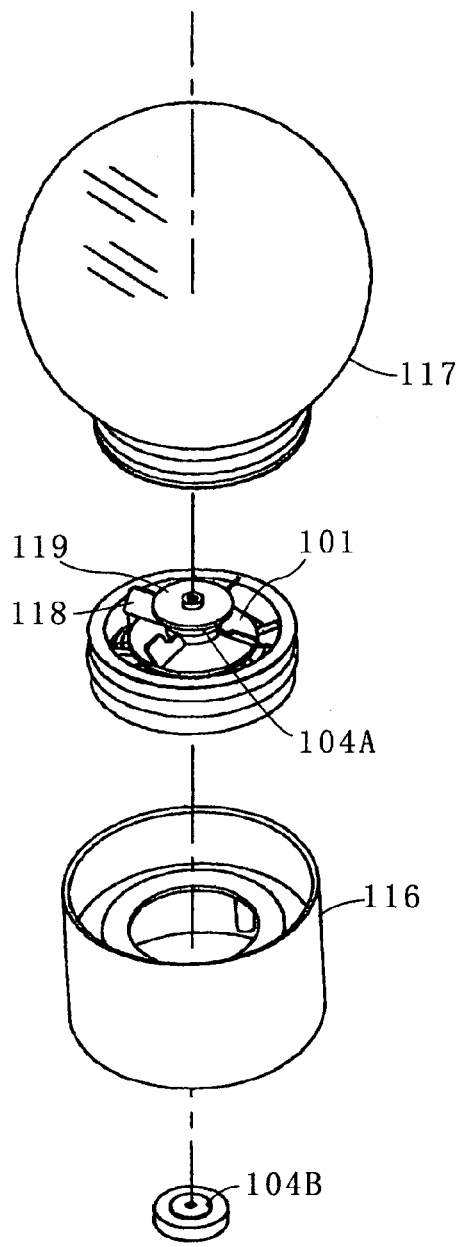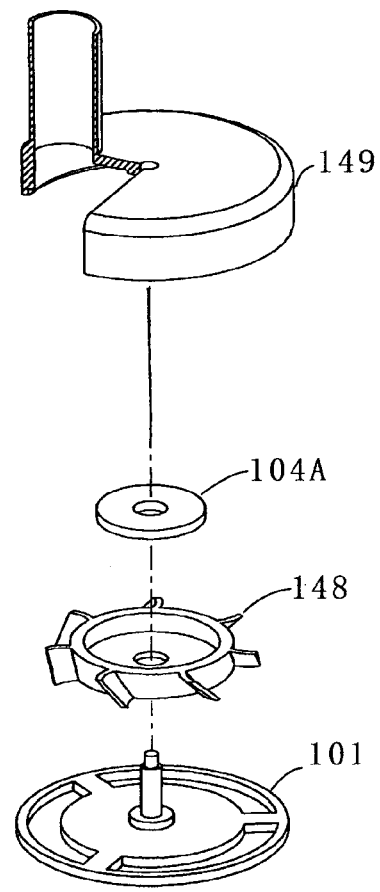
FIG 14
FIG 15

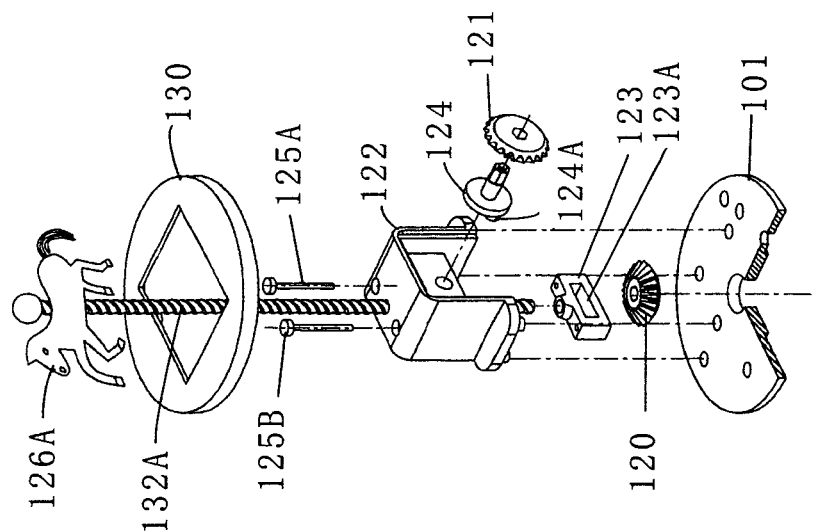
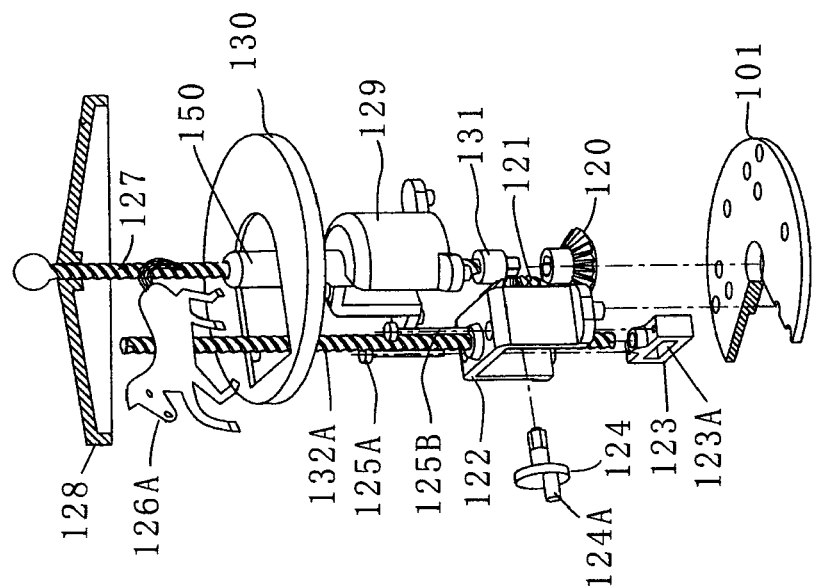
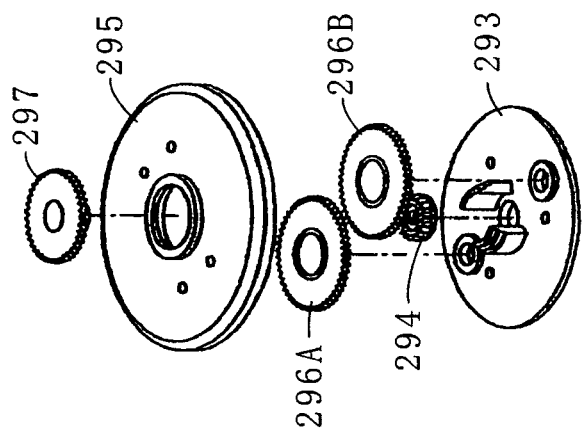
FIG 18
FIG 17
FIG 16

DECORATIVE HUMIDIFIER

FIELD OF THE INVENTION

This invention relates to a humidifier, in particular to a humidifier that can provide a function of decoration.

BACKGROUND OF THE INVENTION

The conventional humidifiers mostly serve the purpose of humidifying the air or the rooms, and are rarely being decorative.

Various examples of conventional humidifiers or decorative structures are listed in the information disclosure statement.

SUMMARY OF THE INVENTION

The present invention relates to a humidifier that can provide a function of decoration, and filtering.

Furthermore, the humidifier of the present invention can provide not only vapor, but also ozone to the air or the rooms, and various embodiments of decorations, most of them involve some subassembly or moving mechanisms, can be used in this invention.

BRIEF DESCRIPTION OF THE DRAWINGS

FIGS. 13, 14, . . . , 27, and 28 illustrate a first, second, . . . , fifteenth, and sixteenth subassembly, respectively, than can be used with the embodiments shown in FIGS. 1-5.

DETAILED DESCRIPTION OF THE INVENTION

Figure 1:
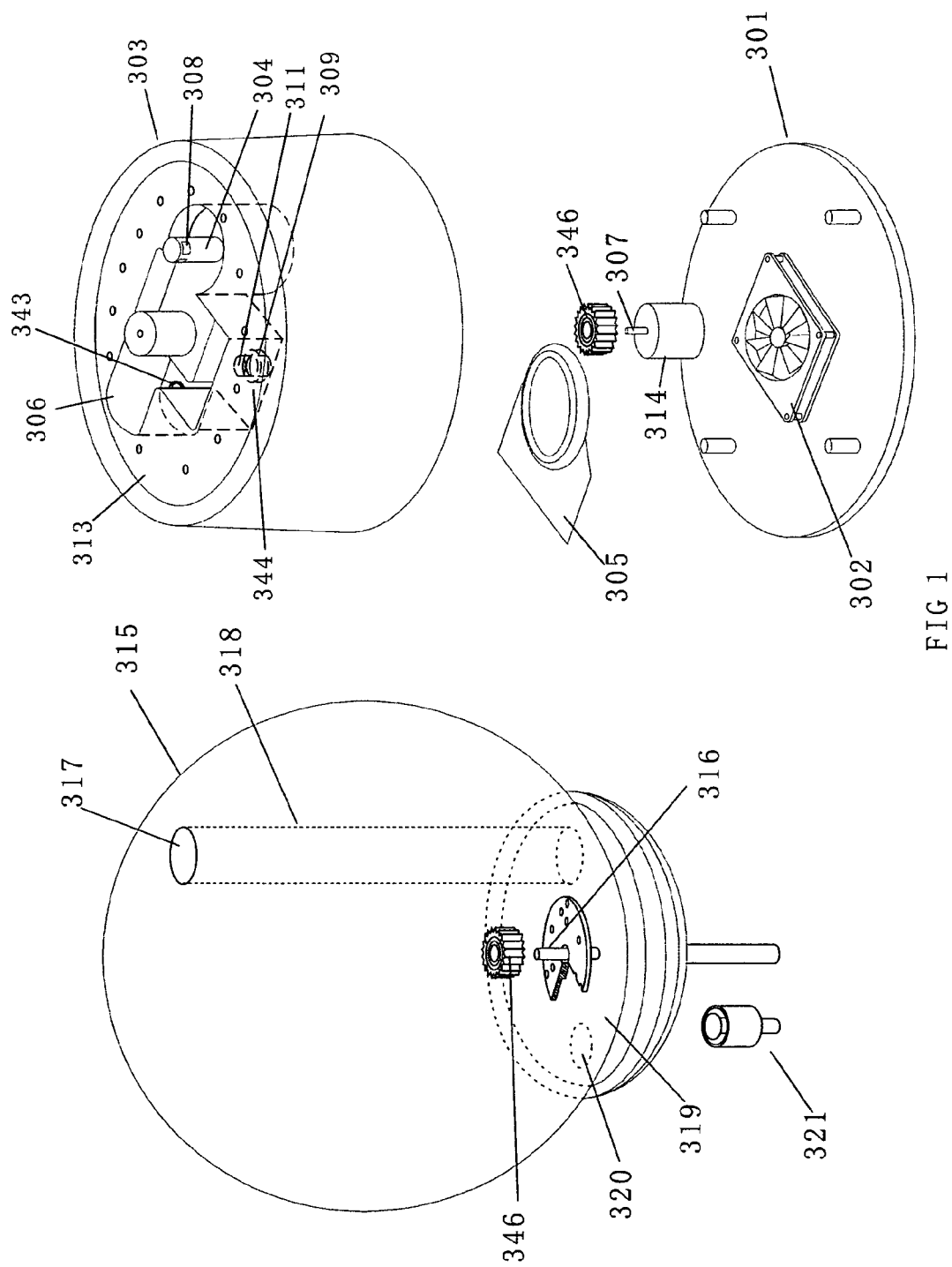
FIG. 1 illustrates an exploded view of the first embodiment of the present invention.
Figure 2:
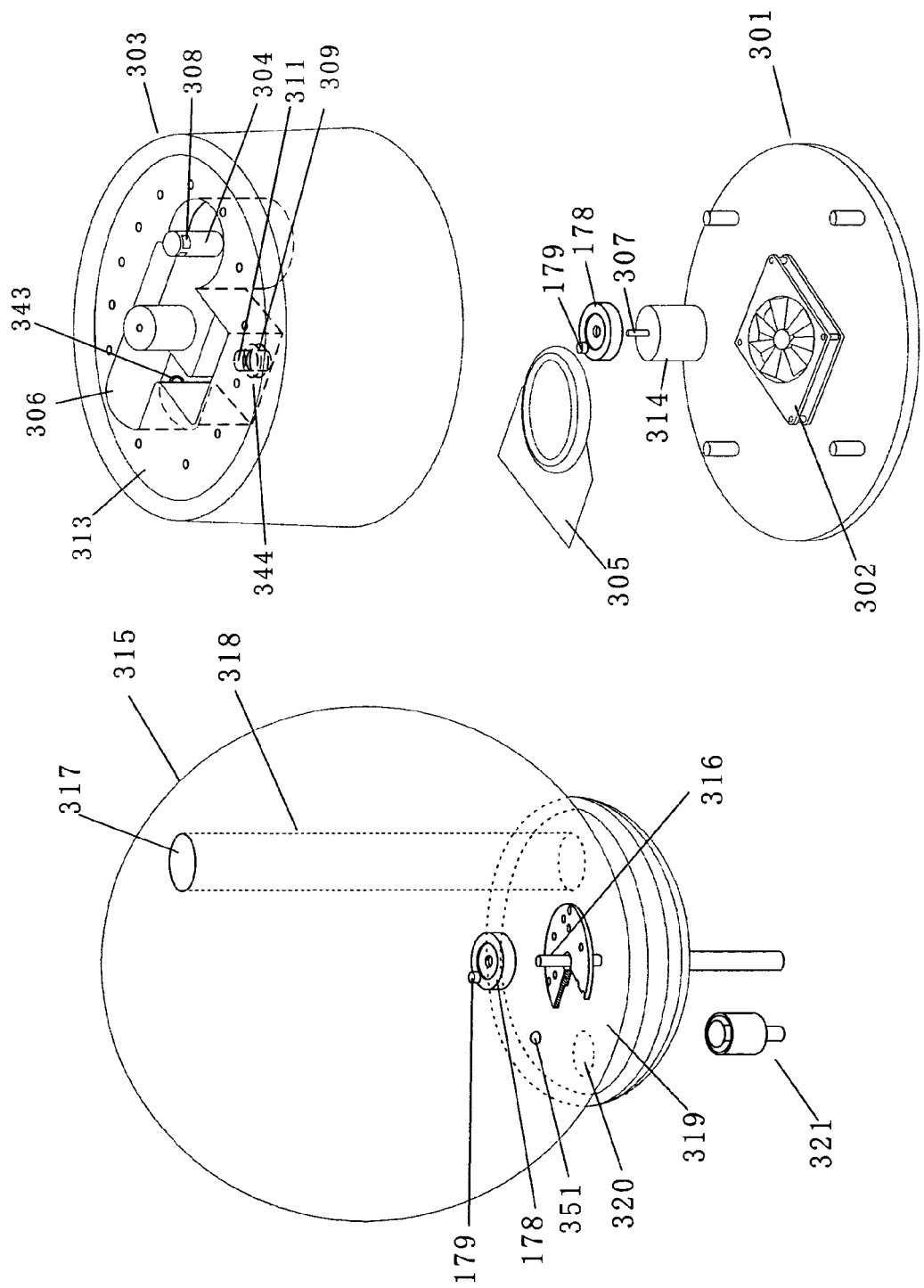
FIG. 2 illustrates an exploded view of the second embodiment of the present invention.
Figure 3:
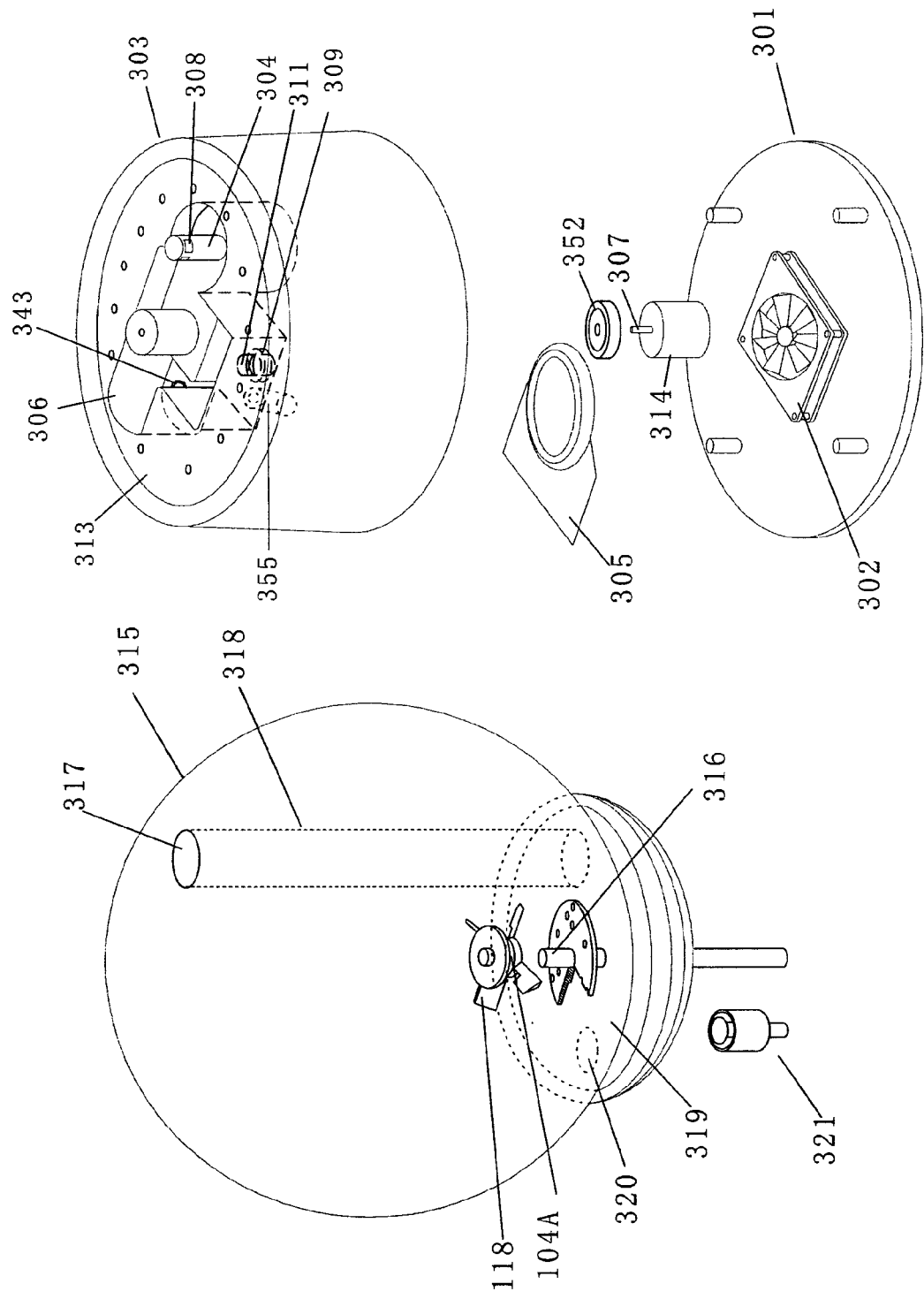
FIG. 3 illustrates an exploded view of the third embodiment of the present invention.
Figure 4:
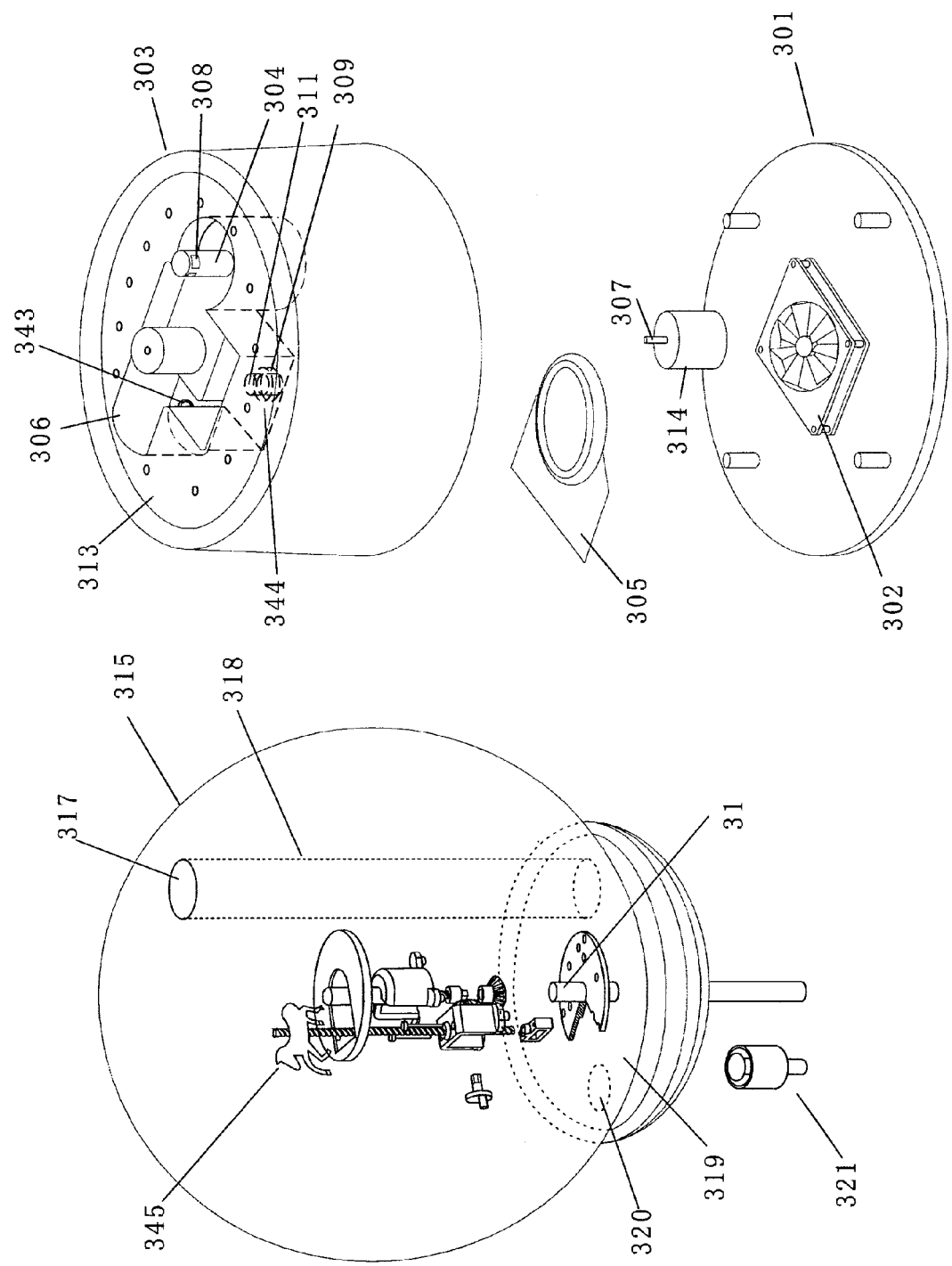
FIG. 4 illustrates an exploded view of the fourth embodiment of the present invention.
Figure 5:
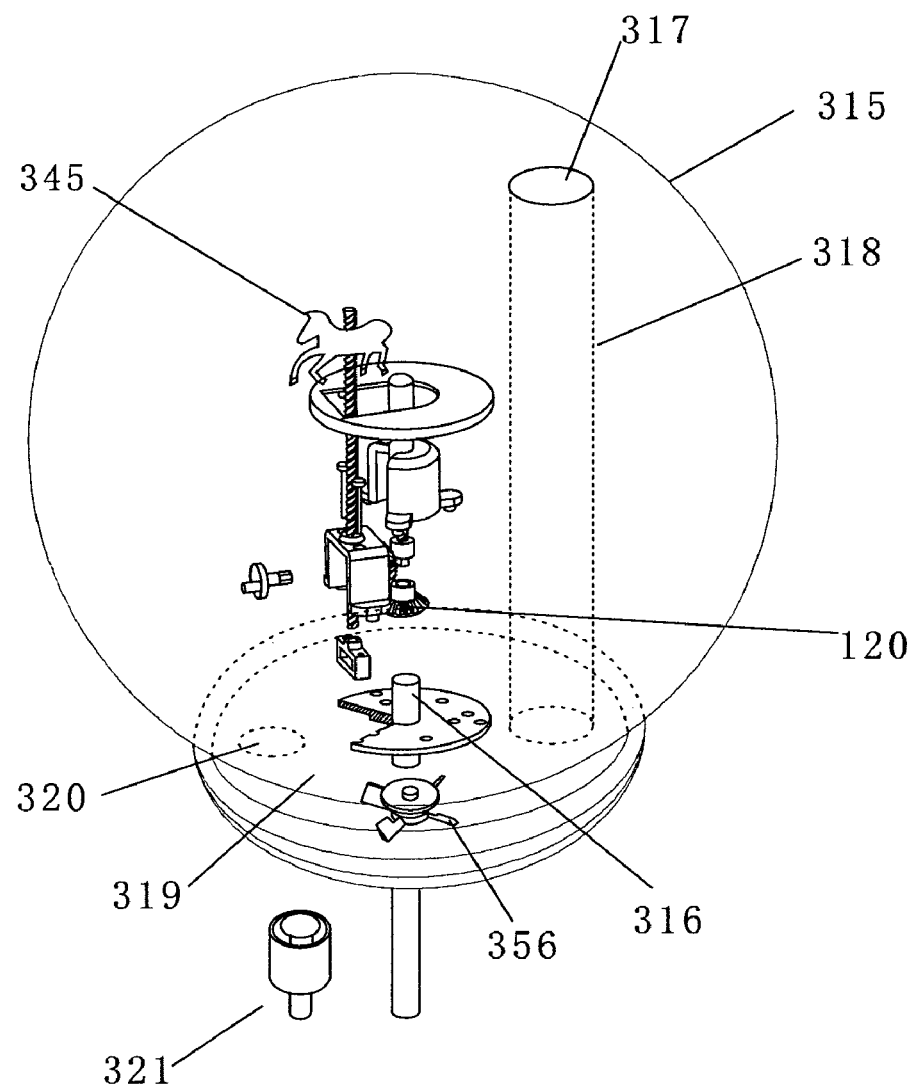
FIG. 5 illustrates an exploded view of the fifth embodiment of the present invention with some structures (e.g., for example a base seat, a abase plate, and relevant parts) not shown in this figure.

The first to fifth embodiments of the present invention shown in FIGS. 1-5 essentially are the same as each other except that in FIG. 1, a power source 314 having a shift 307 which is operatively connected to a gear 346 are provided with the humidifier on a base plate 301 and a base board 319; in FIG. 2, a power source 314 having a shaft 307 which is operatively connected to a wheel 178 with an elongate drive stub 179 are provided with the humidifier on a base plate 301 and a base board 319, a light 351 is provided on the base board 319; in FIG. 3, a power source 314 having a shaft 307 which is operatively connected to a magnet 352 are provided with the humidifier on a base plate 301, a vane (fan) 118 and a magnet 104A are provided on the base board 319; in FIG. 4 simply the power source 314 having a shaft 307 are provided with the humidifier on a base plate 301, and a subassembly 345 and another shaft 316 are shown in a water receptacle 315; in FIG. 5, a fan 356, another shaft 316 and a subassembly 345 are provided in a water receptacle 315.

Please see FIGS. 1-4 for the detailed structure of the humidifier of the present invention. The humidifier mainly includes a base plate 301, a base seat 303, a water receptacle 315, a fan 302 installed on the base plate 301, a power source 314 (which can be a motor, a music box or the like), a shaft 307 of the power source 314, a sub-receptacle of water 306 in the base seat 303, a ultrasonic device 305 for transforming water into vapor, and a base board 319 of the water receptacle 315. The water receptacle 315 and the base board 319 are attached and sealed together so that the water in the water receptacle 315 does not leak through the border between the water receptacle 315 and the base board 319.

A water opening 320, a water exit valve 321, a vapor guide tube 318, and a vapor exit 317 are provided on the base board 319 for water receptacle 315. A spring not shown in the water exit valve 321 is provided for controlling the flow rate and on/off of the water flow downwardly from the water receptacle 315 through the base board 319, to the sub-receptacle for water 306. A shaft 316 operatively connected to the shaft 307 can be fastened with a gear 346. An opening not shown the drawing can be provided on the upper side of the water receptacle 315 to refill water, the water receptacle 315 is fixed on top of the base seat 3.

Figure 6:
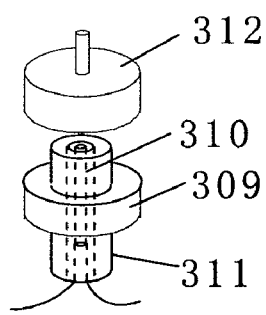
FIG. 6 depicts an automatic safety device for the humidifier.
Figure 7:
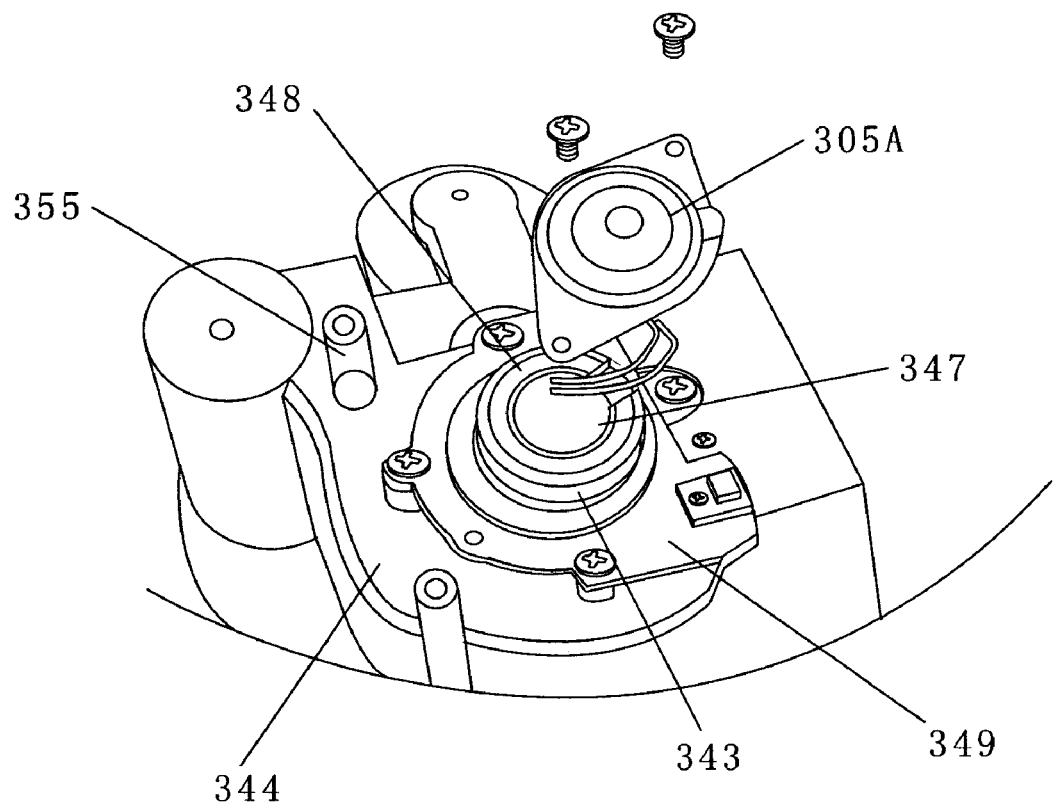
FIG. 7 depicts a ultrasonic device for transforming water into vapor.

An air guide to be 304 with an air opening 308 is provided on the sub-receptacle for water 306. Numeral 311 designates a water separation tube which is shown in FIG. 6; numeral 344 designates a base face of the sub-receptacle 306 for water; numeral 343 designates an opening where an ultrasonic device 305 (for transforming water into vapor) is installed next to it. The detailed structure of the ultrasonic device 305 is shown in FIG. 7. The ultrasonic device 305 can be replaced with a heater, a fan, or other conventional device for transforming water into vapor. Numeral 313 designates an upper face of the base seat 305.

When the humidifier is to be used, the water receptacle 315 is filled with water, the water can flow through the water opening 320 and into the sub-receptacle of water 306. The humidifier is turned on, the ultrasonic device 305 generates vapor. The fan 302 on the base plate 301 sucks air from the space under the fan 302 upwardly, forces the air to go through the air guide tube 304, toward the air opening 308. A recessed space is formed around the vapor guide tube 318 and the air guide tube 304 at the base board 319 for collecting vapor there. The air which is forced through the air opening 308 pushes the vapor through the vapor guide tube 318 and forces the vapor to exit through the vapor exit 317.

From the right upper half of FIG. 1, we can see that the air guide tube 304 is higher than the sub-receptacle of water 306 and the upper face 313 of the base seat 303, and the upper face 313 contacts tightly with the base board 319 of the water receptacle 315, therefore the water would not flow downward through the air opening 308.

When the power source 314 is turned on, the shaft 307 and the shaft 316 on top of the what 307 rotates to move the subassembly or the decoration (shown in e.g. FIGS. 13-28) operatively connected therewith.

Numeral 355 in FIGS. 3 and 7 designates an ozone mechanism for delivering ozone into the water in the sub-receptacle of water 306 under the water receptacle 315, so that the water therein contains ozone and the vapor from the humidifier also contains ozone. Alternatively, the ozone mechanism 355 can also be provided on the base seat 303. The fan 302 on the base plate 301 sucks air from the space under the fan upwardly, forces the air and the zone to go through the air guide tube 304, toward the air opening 308, so that the air, ozone, and vapor go through the vapor guide tube 318 and exit through the vapor exit 317.

In FIGS. 4 and 5, a subassembly 345 can be installed in the water receptacle 315. Alternatively, the subassemblies or structures shown in FIGS. 9, 12 and 16-28 can also be installed therein.

In FIG. 5, a fan 356 and the subassembly 345 are installed in the water receptacle 315 so that the fan 356 and the subassembly 345 (or other subassemblies or structures shown in FIGS. 8, 9, 12, 16-28) can be rotated simultaneously.

FIG. 6 depicts an automatic safety device for the humidifier, which is installed at the base face 344 of the sub-receptacle of water 306 on the base seat 303. The automatic safety device includes mainly a water separation tube 311, a sensing piece 310 in the water separation tube 311, a magnetic float 309 around the water separation tube 311, and a fixed head 312. When the sub-receptacle of water 306 is filled with water, the magnetic float 309 floats, thus the magnetism of the magnetic float 309 is sensed by the sensing piece 310 and the power is energized. On the other hand, when there is not enough water in the sub-receptacle of water 306, the magnetic float 309 drops downwardly, and the power is deenergized. This mechanism can be used in other drawings or embodiments of the humidifier of this invention.

FIG. 7 depicts a detailed structure of the ultrasonic device 305 for transforming water into vapor, in which numeral 347 designates an ultrasonic sheet which is surrounded with a rubber sheet 348. A printed circuit board 347 is provided for the ultrasonic device 305. An opening 343 is provided on the sub-receptacle of waster 306 of the base seat 303. Numeral 344 designates a base face of the sub-receptacle of water 306. An upper lid 305A holds the ultrasonic sheet 347 and the rubber sheet 348 in place, so that the water would not leak. When the humidifier is activated, the ultrasonic sheet 347 is activated to transform the water in the sub-receptacle of water 306 into vapor.

Figure 8:
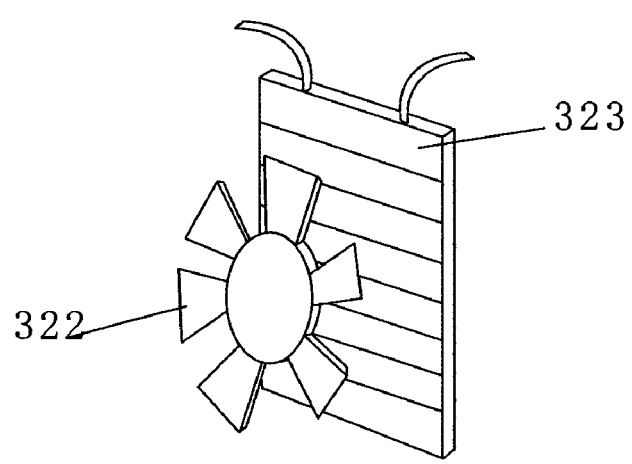
FIG. 8 depicts another device for transforming water into vapor.

FIG. 8 depicts an alternative device for transforming water into vapor, in which a numeral 323 designates heating sheets 323 and a numeral 322 designates a fan. When the humidifier is activated, the fan 322 blows air and/or water through the heating sheets 323. The heating sheets can also be used for heating the water in the receptacle 315 or the sub-receptacle of water 306. they can be also used in the other embodiments of the present invention, e.g., they can be used in FIGS. 9 and 12.

Figure 9:
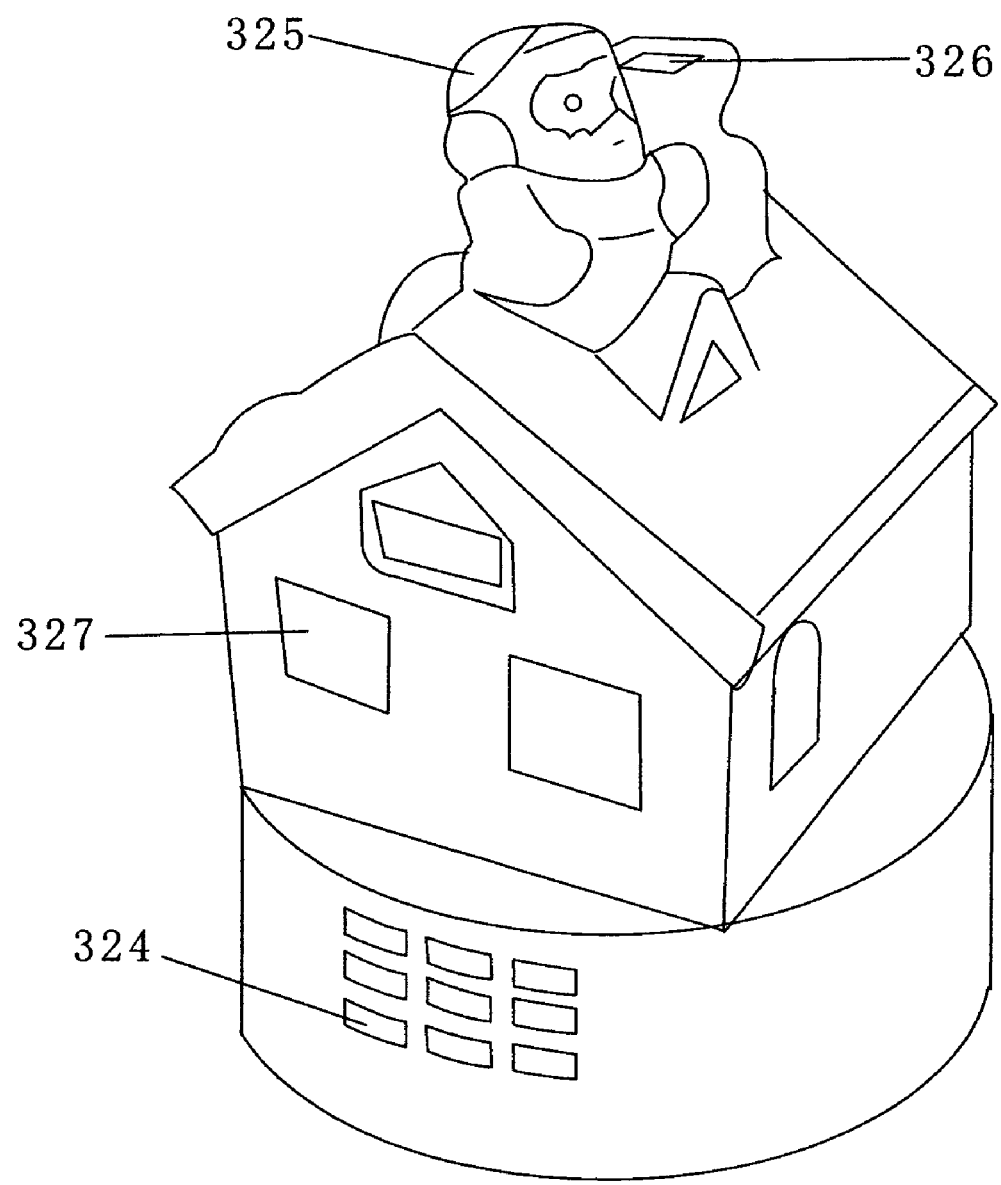
FIG. 9 illustrates a decoration that can be attached to the humidifier of the present invention.

FIG. 9 illustrates a decoration that can be attached to the humidifier, in which the vapor can exit through a vapor exit 326. The decoration 325 can be moved by a moving mechanism described in this invention so that it can move outside of the water receptacle 315. A light bulb (not shown in the drawings) can be provided on the base seat 302 of FIGS. 1-4 so that light beams can go out through windows 327. The heating sheets 323 and the fan 322 (shown in FIG. 8) can be installed inside of the air exits 324 so that heated air can exit from the air exits 324.

Figure 10:
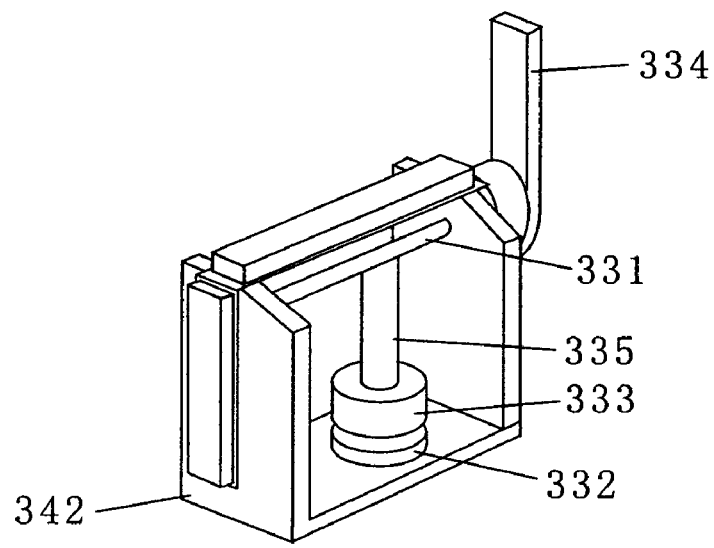
FIGS. 10 and 11 illustrates two moving mechanisms used with a decoration shown in FIG. 12.
Figure 11:
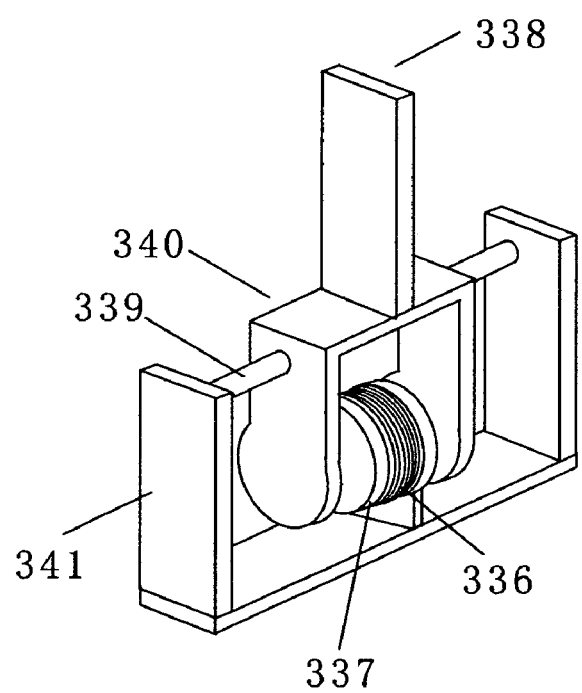
Figure 12:
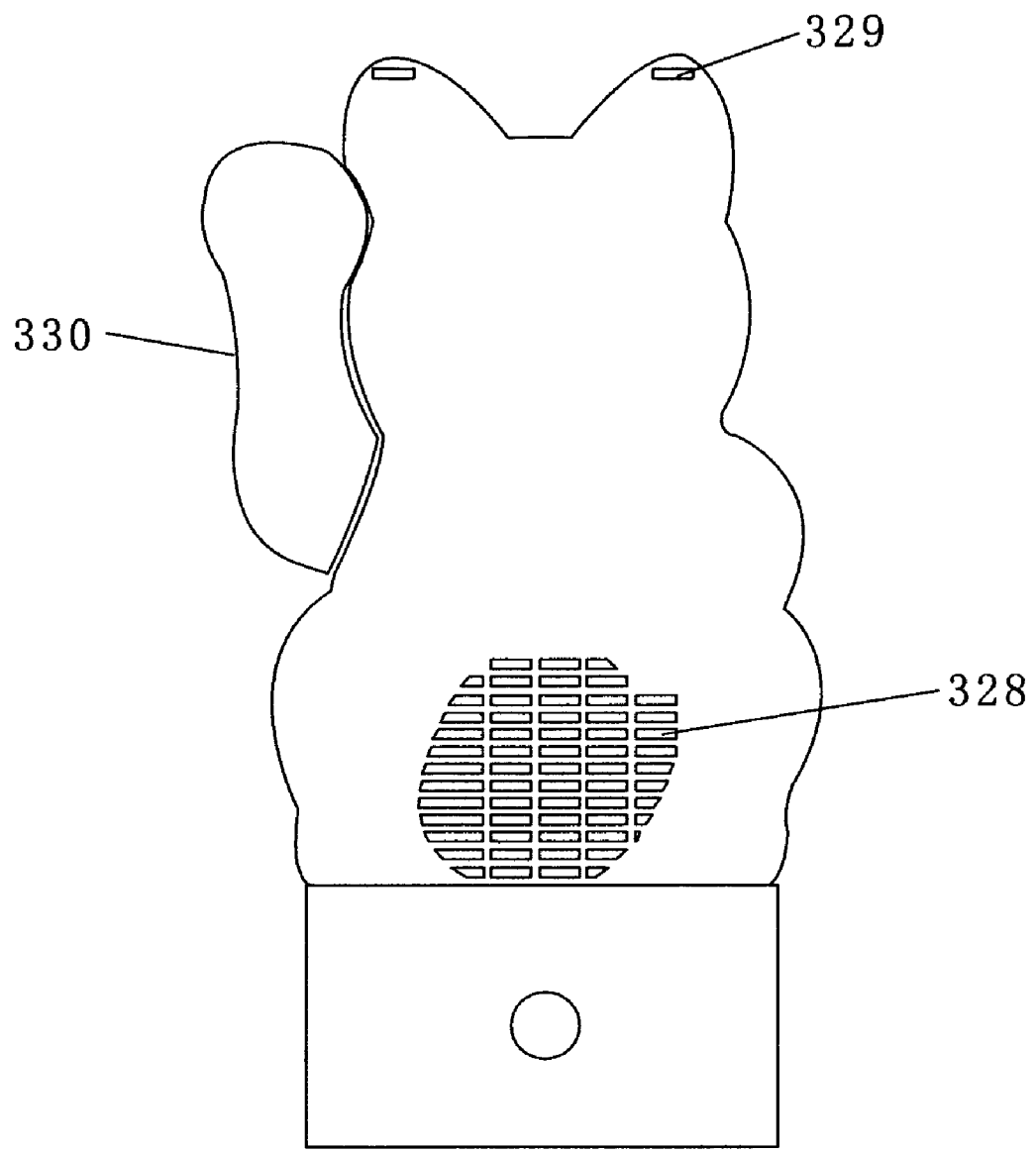
FIG. 12 illustrates another decoration that can be attached to the humidifier.

FIG. 12 illustrates another decoration that can be attached to the humidifier, and FIGS. 10-11 illustrate two moving mechanisms used with the decoration of FIG. 12. The moving mechanisms shown in FIGS. 10-11 include mainly a coil 332, 336; a magnet 333, 337; a shaft 339, 331; a rocking arm 334, 338; a rocking rode 335, 340; and a fastening frame 341, 342. when the coil 332, 336 is energized, a magnetic force is generated, the rocking rod 335, 340 moves back and forth, thus the rocking arm 334, 338 moves therewith. This makes an arm 330 in, FIG. 12 moves back and forth. Numeral 329 in FIG. 12 designates a vapor exit from which a vapor can exit. If the heating sheets 323 and the fan 322 shown in FIG. 8 is used in this embodiment, a vapor and hot air can exit from an exit 328, or just hot air can exist from the exit 328.

The mechanisms shown in FIG. 10-12 can also be used with other embodiments of this invention.

Figure 13:
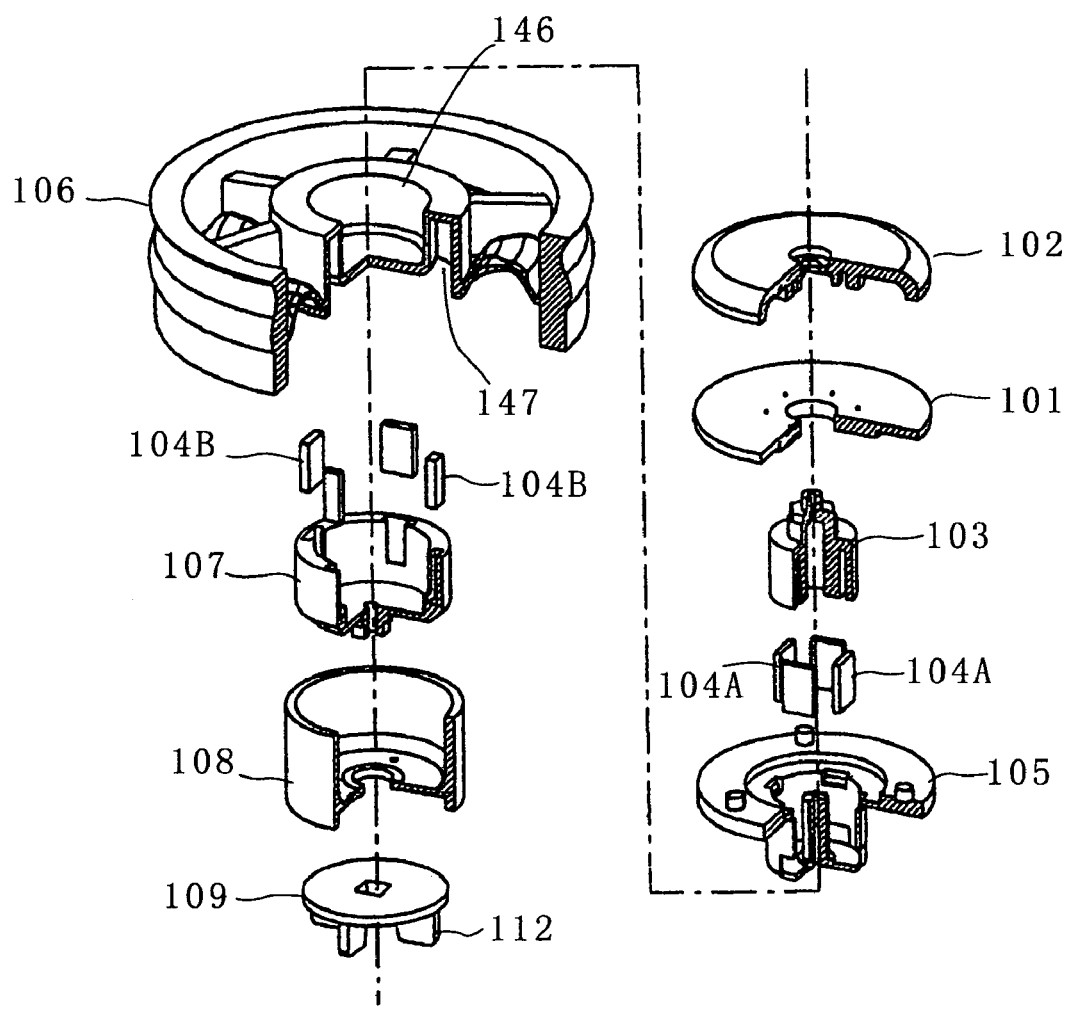

FIGS. 13-28 have basically been shown in a U.S. Pat. No. 6,978,654 (hereinafter designated as '654) invented by the same inventor as that of the present invention. FIGS. 13, 14, . . . , 27, and 28 illustrate a first, second, . . . , fifteenth, and sixteenth subassembly, respectively, that can be used with the embodiments shown in FIGS. 1-5.

FIG. 13 basically is the same as FIG. 1 of '564, but without the musical box and relevant parts shown on the left side thereof. In FIG. 13 the first magnets 104A and the second magnets 104B are for transmitting a movement from a power source from under a stopper member 106 to over the stopper member. A first rotary member 103, a second rotary member 107, a connecting member 105, and a lid 101 can further be provided. The first magnets 104A are installed in the first rotary member 103, the second magnets 104B are installed in the second rotary member 107, the connecting member 105 is fastened to the stopper member 106 and is provided for rotatably accommodating the first rotary member 103, the lid 101 is installed on the connecting member 105 for preventing the first rotary member 103 from falling off. The stopper member 106 can be provided with a first recessed portion 146 for accommodating the first rotary member 103 and the connecting member 105, and a second recessed portion 147 for accommodating the second rotary member 107.

The second rotary member 107 is fastened to the rotary piece 109 so as to rotate therewith. A socket member 108 which can be fastened to the stopper member 106 is for accommodating the second rotary member 107 so as to confine or stabilize the movement of the second rotary member 107. Numeral 102 designates a support on which a figurine or a subassembly can be positioned.

A rotary coupler 112 provided with the rotary piece 109 can be engaged with the shaft 307 or 316 of FIGS. 1-4 or other embodiments so that the subassembly shown in FIG. 13 can be in the water receptacle 315. The stopper member 106 can be rubber, metal, plastic or other suitable material.

FIG. 14 is the same as FIG. 4 of '564 but without the musical box and relevant parts. In FIG. 14, the subassembly has a decorative base member 116, a transparent housing 117, at least a first magnet 104A, and at least a second magnet 104B, at least one vane 118 fastened to the first magnet 104A for agitating some particles in the transparent housing 117 so that it looks like some flurries are moved upwardly and falling down. A lid 101 for installing the vane 118 and the magnet 104A; and another lid 119 provided to prevent the vane 118 and the magnet 104A falling off. The subassembly can work with the magnet 352 shown in FIG. 3 or the shaft 307 or 316 and FIGS. 1-4, or other embodiments, so that it can be in the water receptacle 315.

FIG. 15 is the same as FIG. 5 of '564, in which the subassembly includes a rotary member 148 and a magnet 104A positioned in a lid 101; and a lid 149 covering the lid 101, the rotary member 148, and the magnet 104A and has an opening so that the particles agitated by the rotary member 148 can exit. This subassembly can be connected to the shaft 307 or 316 and can work with other embodiments and be inside of the water receptacle 315.

Please note that the subassemblies shown in FIGS. 16-28 cannot be inside of the water receptacle 315, but also be outside of the water receptacle 315.

FIG. 16 is the same as FIG. 7 of '564, in which a gear 294 over a lid 293 is connected with the shaft 307 or 316 shown in FIGS. 1-4, two gears 296A and 296B are located engageable with the gear 294. The teeth of the gears 296A and 296B engage with teeth of a rotary cover 295. The teeth of the rotary plate 295 are provided on the inside face of a vertical wall on the peripheral of the rotary cover 295. When the shaft 307 or 316 rotates counterclockwisely, the gear 294 does the same, and the gears 296A and 296B, and the rotary cover 295 rotate clockwisely, and vice versa. A gear 297 can be fastened to the gear 294 or the rotary cover 295 so as to drive other elements not shown in the drawings. We can also eliminate the gear 297 and have a figurine or decoration mounted on the rotary cover 295. The subassembly shown in FIG. 16 can work with other embodiments or subassemblies and can be inside or outside of the water receptacle 315.

FIG. 17 is the same as FIG. 8 of '564, in which a gear 120 on a lid 101 can be connected with the shaft 307 or 316 shown in the FIG. 1-4. A connecting piece 131 is fastened to the gear 120 and is fixed with a rotary shaft 127 which is installed with a canopy 128. A housing 129 is provided around the shaft 127 indirectly (with a tube 150 in between) to stabilize the rotation of the shaft. The purpose of the tube 150 is to protect the shaft 127. A plate 130 is positioned around the shaft 127 for supporting some decoration (not shown in the drawings). Another gear 121 is engaged with the gear 120 and fastened with a wheel 124 which has an elongate drive stub 124A. A housing 122 is fixed to the lid 101 and is provided around the wheel 124. Another rotary shaft 132A and two guiding rods 125A and 125B are vertically inserted through the housing 122. A link 123 with a longitudinal slot 123A is fastened to the lower end of the rotary shaft 132A. A figurine (horse) 126A is fastened to the upper part of the rotary shaft 132A. The elongate drive stub 124A is movably located in the longitudinal slot 123A. The rotation of the gear 120 causes the rotation of the gear 121 and the wheel 124, which in turn causes the up and down movement of the link 123, the shaft 132A, the guiding rods 125A and 125B, and the horse 126A. The subassembly shown in FIG. 17 can work with other embodiments or subassemblies and can be inside or outside of the water receptacle 315.

FIG. 18 is the same as FIG. 9 of '564, in which a gear 120' on a lid 101 can be connected with the shaft 307 or 316 shown in FIGS. 1-4. Another gear 121 is engaged with the gear 120 and fastened with a wheel 124 which has an elongate drive stub 124A. A housing 122 is fixed to the lid 101 and is provided around the wheel 124. Another rotary shaft 132A and two guiding rods 125A and 125B are vertically inserted through the housing 122. A link 123 with a longitudinal slot 123A is fastened to the lower end of the rotary shaft 132A. A figurine (horse) 126A is fastened to the upper part of the rotary shaft 132A. The elongate drive stub 124A is movably located in the longitudinal slot 123A. The rotation of the gear 120 causes the rotation of the gear 121 and the wheel 124, which in turn causes the up and down movement of the link 123, the shaft 132A, the guiding rods 125A and 125B, and the horse 126A. The subassembly shown in FIG. 18 can work with other embodiments or subassemblies and can be inside or outside of the water receptacle 315.

Figure 19:
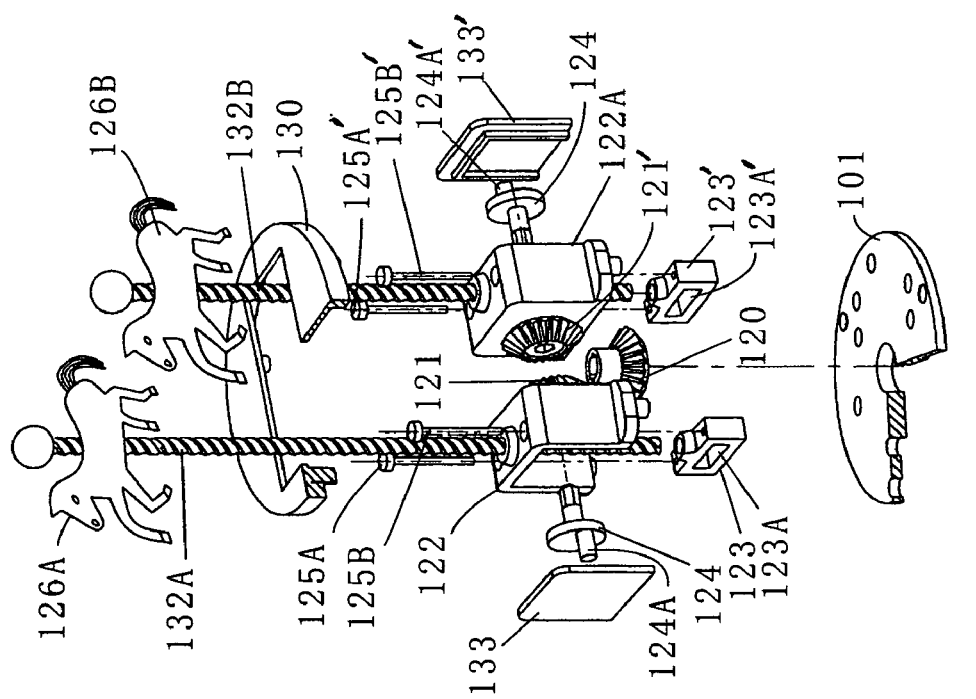

FIG. 19 is the same as FIG. 10 of '564, in which a gear 120 over a lid 101 can be connected with the shaft 307 or 316 shown in FIGS. 1-4. Two other gears 121 and 121' are engaged with the gear 120 and fastened with wheels 124 and 124', respectively, which have elongate drive stubs 124A and 124A' respectively. Housings 122 and 122A are fixed to the lid 101 and are provided around the wheels 124 and 124' respectively. Rotary shafts 132A and 132B and two pairs of guiding rods 125A, 125B, and 125A', 125B' are inserted through the housings 122 and 122A respectively. A plate 130 is provided around the shafts 132A and 132B for supporting some decoration (not shown in the drawings). Links 123 and 123' with longitudinal slots 123A and 123A' respectively are fastened to the lower end of the rotary shafts 132A and 132B respectively. The elongate drive stubs 124A and 124A' are movably located in the longitudinal slots 123A and 123A' respectively. The rotation of the gear 120 causes the rotation of the gears 121 and 121' and the wheels 124 and 124', which in turn causes the up and down movement of the links 123 and 123', the shafts 132A and 132B, the guiding rods 125A, 125B, 125A' and 125B', and the horses 126A and 126B. Decoration plates 133 and 133' are employed to cover a side of the housings 122 and 122A respectively. The subassembly shown in FIG. 19 can work with other embodiments or subassemblies and can be inside or outside of the water receptacle 315.

Figure 20:
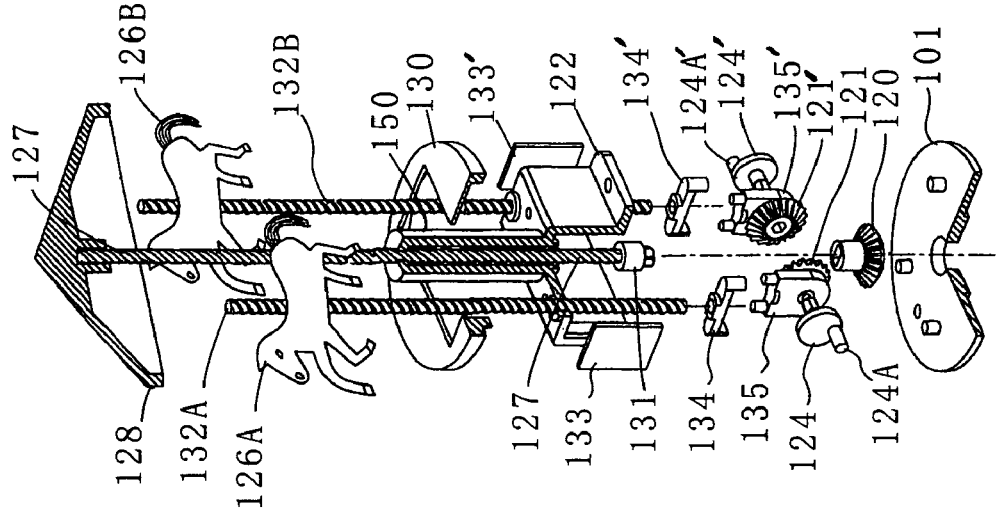

FIG. 20 is the same as FIG. 11 of '564, in which a gear 120 over a lid 101 can be connected with the shaft 317 or 316 shown in FIGS. 1-4. FIG. 20 differs from FIG. 19 in that a connecting piece 131 is fixed to the gear 120 and is fastened with a rotary shaft 127 which is protected with a tube 150 and which is fastened with a canopy 128 on its top end. That is to say, all of the elements shown in FIG. 20, except the connecting piece 131, the rotary shaft 127, the tube 150, and the canopy 128, can also be exactly the same as the third embodiment shown in FIG. 19, instead of those shown in FIG. 20. In FIG. 20, one housing 122 is employed to replace the two housings 122 and 122A shown in FIG. 19. Links 134 are fastened to the lower ends of the shafts 132A and 132B respectively for being moved by the elongate drive stubs 124A and 124A, respectively. Two connecting pieces 135 are employed for installing the wheels 124, 124' and the gears 121, respectively. The subassembly shown in FIG. 20 can work with other embodiments or subassemblies and can be inside or outside of the water receptacle 315.

Figure 21:
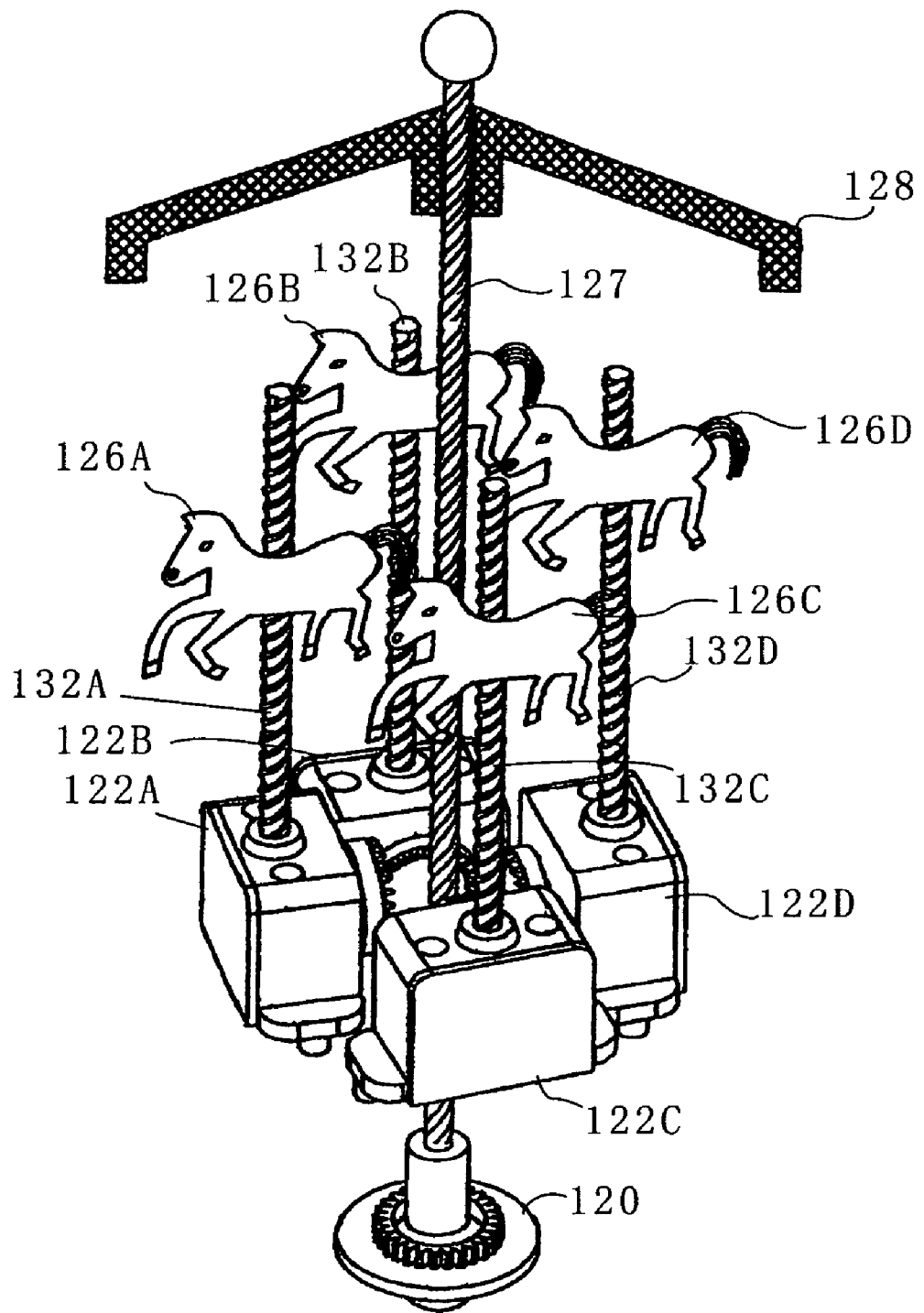

FIG. 21 is the same as FIG. 12 of '564, in which a gear 120 can be connected with the shaft 307 or 316 shown in FIG. 1-4. The subassembly shown in FIG. 21 is very similar to the fourth embodiment (FIG. 20) of the subassembly. In FIG. 21, there are four rotary shafts 132A, 132B, 132C, 132D for installing four horses 126A, 126B, 126C, 126D respectively. Four housings 122A, 122B, 122C, 122D are provided around the four rotary shafts 132A, 132B, 132C, 132D respectively. A rotary shaft 127 is installed on a bearing 120 and is fastened with a canopy 128. The subassembly shown in FIG. 21 can work with other embodiments or subassemblies and can be inside or outside of the water receptacle 315.

Figure 22:
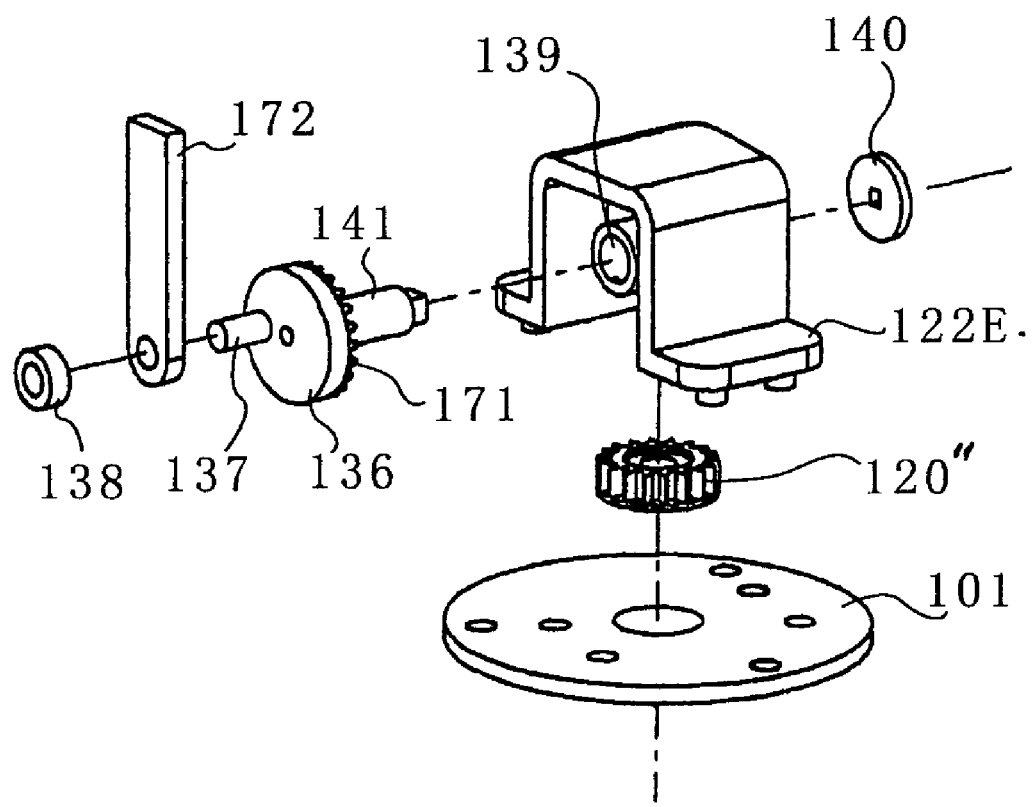
Figure 23:
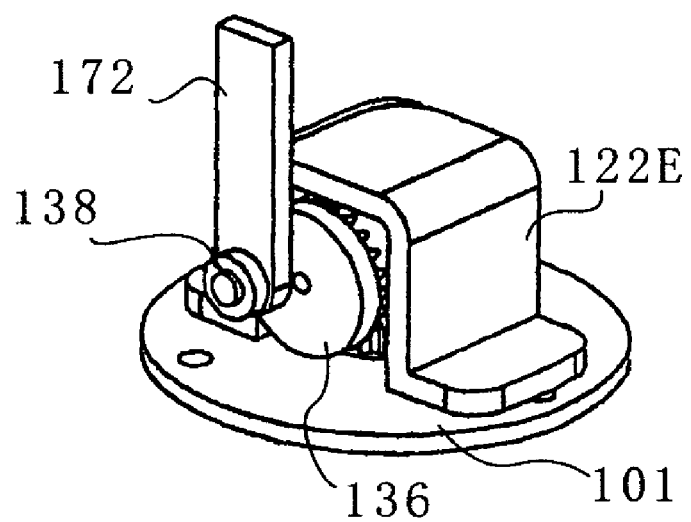

FIGS. 22 and 23 are the same as FIGS. 13 and 14 of '564, in which a gear 120" over a lid 101 can be connected with the shaft 307 or 316 shown in FIGS. 1-4. A housing 122E can be fastened to the lid 101. A support tube 139 is provided on the housing 122E, for rotatably supporting a shaft 141. A wheel 136 and a gear 171 (which is engageable with the gear 120") are fixed on the shaft 144. An elongate drive stub 137 is provided on the wheel 136. The stub 137 can be inserted through a hole provided on a rod 172 on which a figurine or a decoration can be fixed. A ring 138 and a fastening piece 140 are fixed to the stub 137 and the end of the shaft 141, respectively. When the gear 120" rotates, the gear 171 and the wheel 136 rotate, thus in turn the stub 137 causes the rod 172 to do reciprocating movement. The subassembly shown in FIGS. 22 and 23 can work with other embodiments or subassemblies and can be inside or outside of the water receptacle 315.

Figure 24:
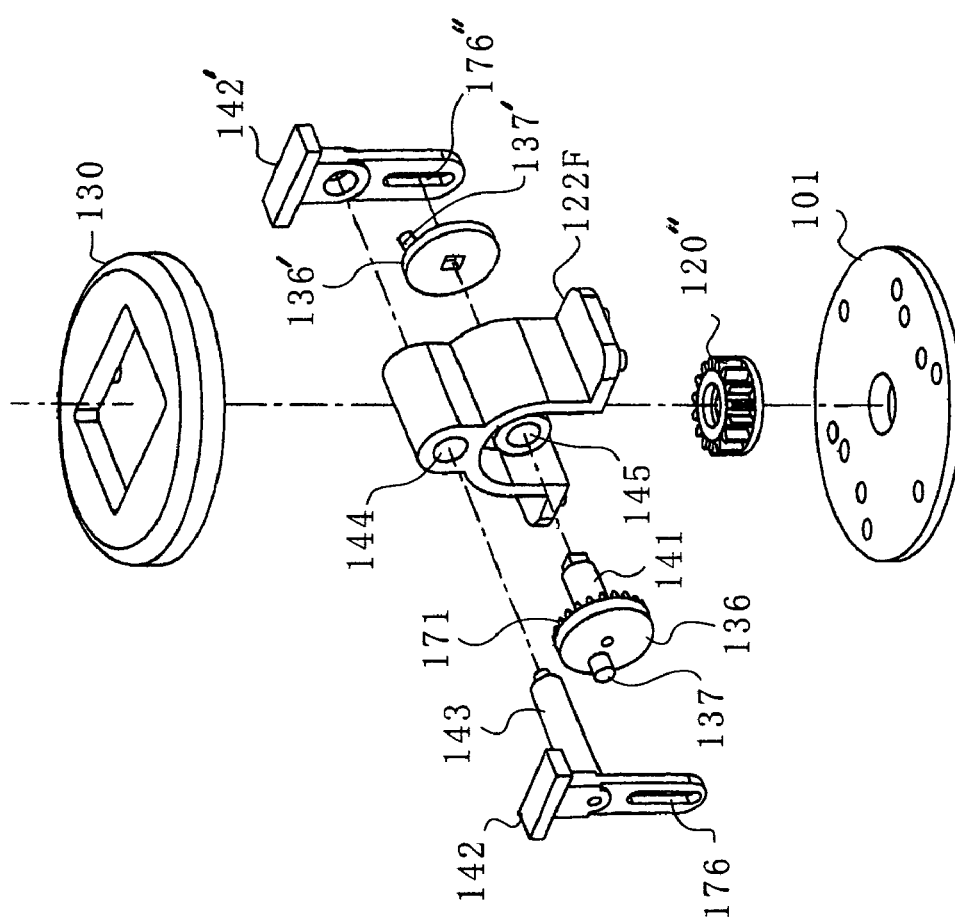

FIG. 24 is the same as FIG. 15 of '564, in which a gear 120" over a lid 101 can be connected with the shaft 307 or 316 shown in FIGS. 1-4. A housing 122F can be fastened to the lid 101. Two support tubes 144 and 145 can be formed on the housing 122F, for rotatably supporting shafts 141 and 143. A wheel 136 and a gear 171 (which is engageable with the gear 120") are fixed on one side of the shaft housing 122F 141. Another wheel 136' is fixed in the other side of the shaft 141. The wheels 136 are 136' are provided with elongate drive stubs 137 and 137', respectively. Connecting pieces 142 and 142' are fixed to the two ends of the shaft 141, respectively. Longitudinal slot 176' and 176", in which the elongate drive stubs 137 and 137' can slide respectively, are formed on the connecting pieces 142 and 142', respectively. Figurines or decorations can be positioned on the connecting pieces 142 and 142'. A plate 130 is provided for supporting figurines or decorations. When the gear 120" rotates, the gear 171, the shaft 141, and the wheels 136 and 136' rotates therewith, thus in turn causes the connecting pieces 142 and 142' to do reciprocating movement. The subassembly shown in FIG. 24 can work with other embodiments or subassemblies and can be inside or outside of the water receptacle 315.

Figure 25:
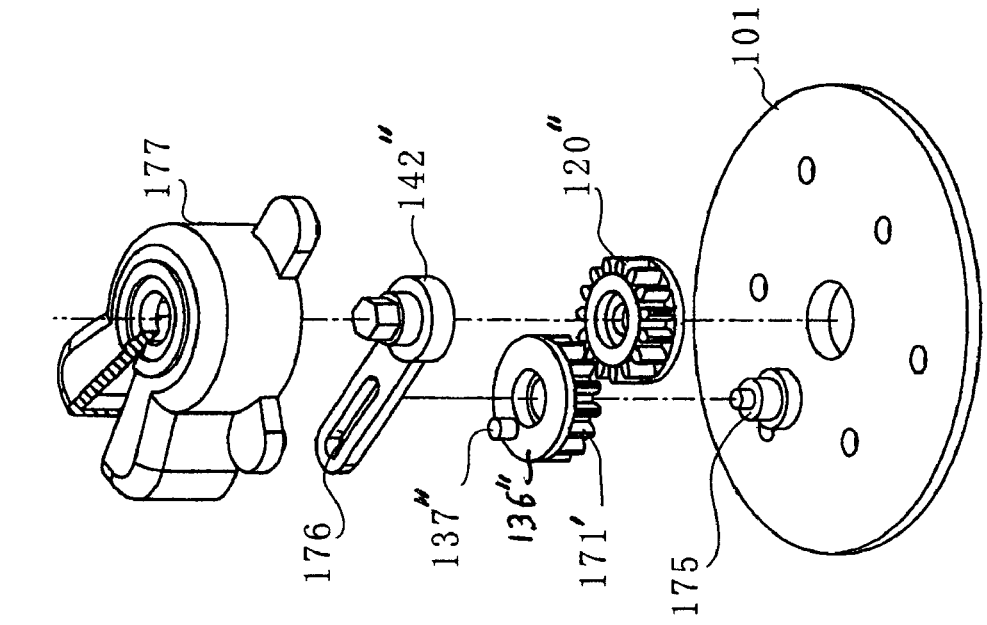

FIG. 25 is the same as FIG. 16 of '564, in which a gear 128" over a lid 101 can be connected with the shaft 307 or 316 shown in FIGS. 1-4. A rod 175 is fixed on the lid 101. A gear 171' and a wheel 136" having a through hole in the central portion thereof respectively are rotatably installed on the rod 175. The gear 171' is engageable with the gear 120". An elongate drive stub 137" is formed on the wheel 136". A connecting piece 142", on which a figurine or decoration can be fixed, is rotatably installed on top of the gear 120". The connecting piece 142" is formed with a longitudinal slot 176 in which the elongate drive stub 137" can slide. A lid 177 is positioned over connecting piece 142" for confining the movement of the connecting piece 142". When the gear 120" rotates, the gear 171', and the wheel 136" rotate, thus in turn causes a reciprocate movement of the connecting piece 142". The subassembly shown in FIG. 25 can work with other embodiments or subassemblies and can be inside or outside of the water receptacle 315.

Figure 26:
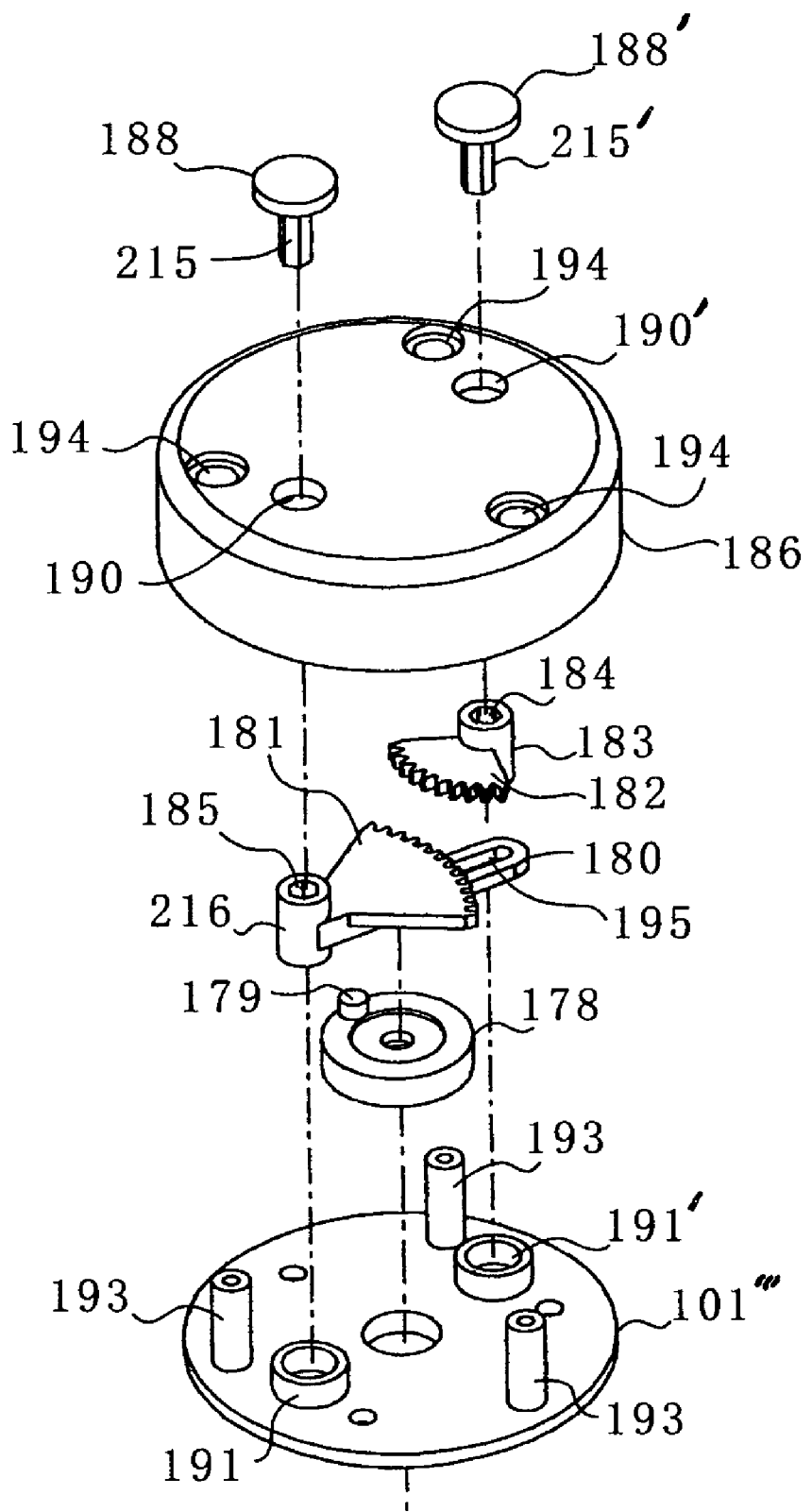

FIG. 26 is the same as FIG. 17 of '564, in which a wheel 178 having an elongate drive stub 179 can be connected with the shaft 307 or 316 shown in FIGS. 1-4. A plurality of tubes 193, 191, 180 having a longitudinal slot 195 is fixed with a tube 216 having a hole 185 and a gear plate 181. A tube 183 having a hole 184 is fixed with a gear plate 182. The elongate drive stub 179 is located in the longitudinal slot 195 and slideable therein when the wheel 178 rotates. A cover plate 186 is positioned on the lid 101''' and is provided with holes 194, 190 and 190'. The upper ends of the tubes 193 are fastened at the holes 194 of the cover plate 186. Two supports 188 and 188' for supporting figurines or decorations thereon are fixed with rods 215 and 215' respectively. The rods 215 and 215' are inserted through the holes 190 and 190' respectively, and fastened in the holes 185 and 184 of the tubes 216 and 183 respectively. The tubes 216 and 183 are rotatably installed in the tubes 191 and 191' respectively. When the wheel 178 rotates, the elongate drive stub 179 drives the moving piece 180, the tube 216 and the gear plate 181 which engages with the gear plate 182 to reciprocate. Thus this causes the gear plate 182, the tube 183, the rods 215 and 215', and the supports 188 and 188' to reciprocate. The subassembly shown in FIG. 26 can work with other embodiments or subassemblies and can be inside or outside of the water receptacle 315.

Figure 27:
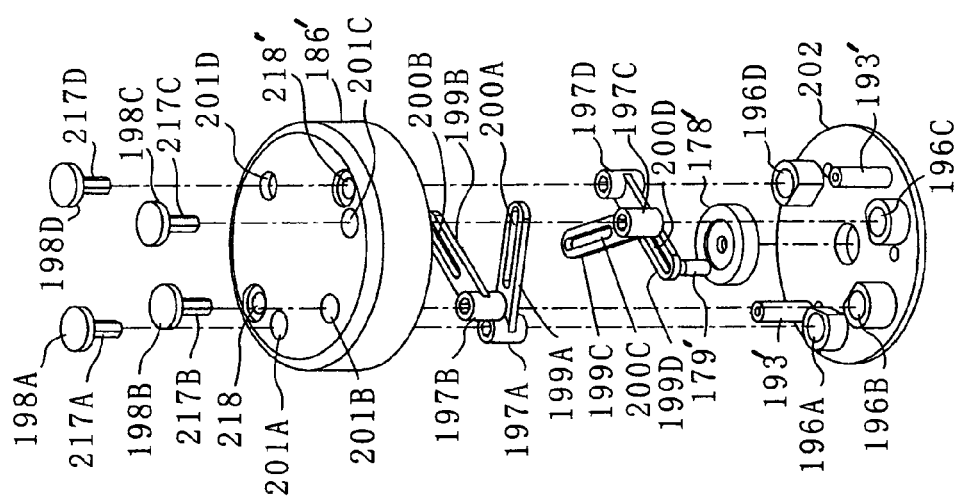

FIG. 27 is the same as FIG. 18 of '564, in which a wheel 178' having an elongate drive stub 179' can be connected with the shaft 307 or 316 shown in FIGS. 1-4. A plurality of tubes 193', 196A, 196B, 196C, and 196D are provided on the lid. Rotary tubes 197A, 197B, 197C, and 197D are rotatably installed in the tubes 196A, 196B, 196C, and 196D respectively, and fastened with connecting pieces 199A, 199B, 199C, and 199D respectively, which are provided with longitudinal slots 200A, 200B, 200C, and 200D respectively. The elongate drive stub 179' can be inserted into the longitudinal slots 200A, 200B, 200C, and 200D and slide therein when the wheel 178' rotates. A cover plate 186' is positioned on the lid 202 and is provided with holes 218, 218', 201A, 201B, 201C, and 201D. Supports 198A, 198B, 198C, and 198D for supporting figurines or decorations thereon are fastened with rods 217A, 217B, 217C, and 217D respectively, which insert through the holes 201A, 201B, 201C, and 201D on the cover plate 186' respectively, and installed in the rotary tubes 197A, 197B, 197C, and 197D respectively. When the wheel 178' rotates, the elongate drive stub 179' drives the connecting pieces 199A, 199B, 199C, and 199D to reciprocate, and the rotary tubes 197A, 197B, 197C, and 197D to rotate, respectively. Thus the rods 217A, 217B, 217C, and 217D, and supports 198A, 198B, 198C, and 198D rotate respectively. The cover plate 186' is fastened to the upper ends of the tubes 193' at the holes 218 and 218'. The movement of the connecting pieces 199A, 199B, 199C, and 199D does not interfere with each other because they are on different heights (levels). The subassembly shown in FIG. 27 can work with other embodiments or subassemblies and can be inside or outside of the water receptacle 315.

Figure 28:
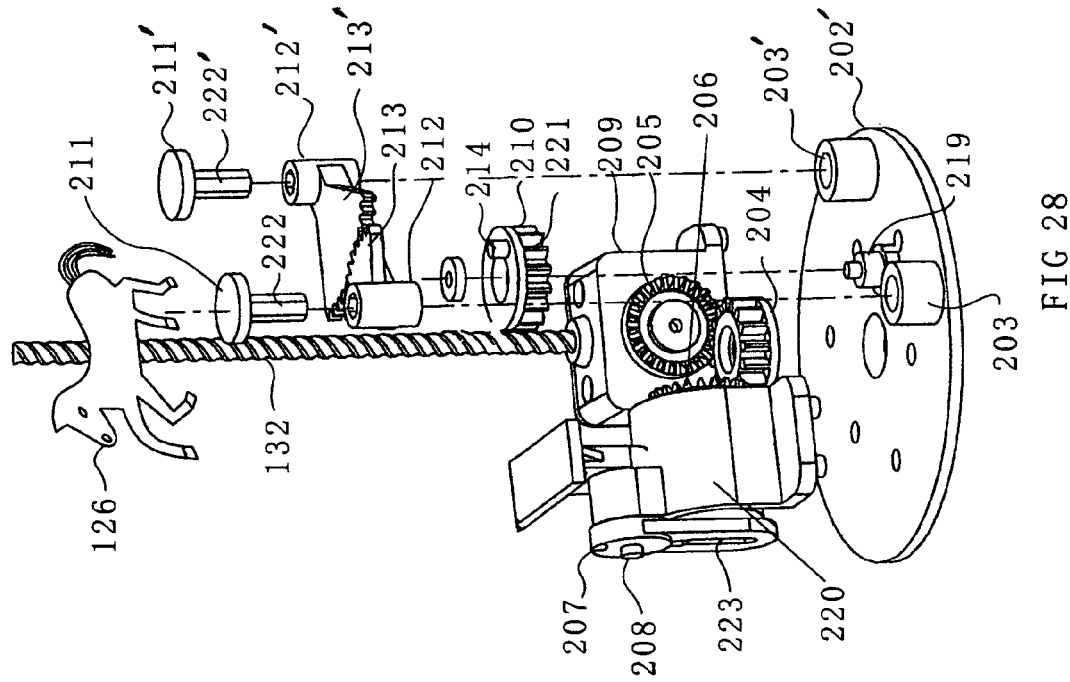

FIG. 28 is the same as FIG. 19 of '564, in which a gear 204 can be connected with the shaft 307 or 316 shown in FIGS. 1-4. A rod 219 and tubes 203 and 203' are provided on the lid 202'. A gear 221 and a wheel 210 having an elongate drive stub 214 are rotatably provided on the rod 219. A gear 204 engageable with the gear 221 can be installed on a rotary rod 219 and tubes 103 (FIG. 1) and rotate therewith. A rotary tube 212 is fixed with a gear plate 213 which is engageable with a gear plate 213' fixed with a rotary tube 212'. A moving piece and a longitudinal slot (in which the elongate drive stub 214 slides) similar to the moving piece 180 and the longitudinal slot 195 shown in FIG. 17 are provided under the gear plate 213 and fixed to the rotary tube 212. Supports 211 and 211' for supporting figurines or decorations having rods 222 and 222' are fastened to the rotary tubes 212 and 212' respectively, with the rods 222 and 222' inserted into the tubes 212 and 212' respectively. When the wheel 210 rotates, the stub 214 drives the tubes 212 and 212', the gear plates 213, and 213', and the supports 211, and 211' to move. A housing 209 is fastened to the lid 202', with a rotary shaft 132 provided therethrough. A gear 205 (engageable with the gear 204) and a wheel with an elongate drive stub (not shown in the drawing) (similar to the gear 121 and wheel 124 with an elongate drive stub 124A in FIG. 8) can be installed on the housing 209. A link with a longitudinal slot (not shown in the drawing) (similar to the link 123 with the longitudinal slot 123A in FIG. 8) can be fixed to the lower end of the shaft 125. When the wheel 205 rotates, the shaft 132 and the horse 126 move upwardly and downwardly. Another housing 220 is fastened to the lid 202' with a gear 206 rotatably installed on it. The gear 206 is engageable with the gear 204. The inside structure of the housing 220 is similar to that shown in FIGS. 13 and 14 (i.e., a wheel with an elongate drive stub not shown in the drawing is fastened to the gear 206). A connecting piece 207 having a longitudinal slot 223 is rotatably installed on a shaft 208. The elongate drive stub in the housing 220 is located in the longitudinal slot 223 and can slide thereon. A figurine or a decoration can be fastened to the connecting piece 207. When the gear 206 rotates, the wheel rotates, the stub drives the connecting piece 207 to reciprocate. The subassembly shown in FIG. 28 can work with other embodiments or subassemblies and can be inside or outside of the water receptacle 315.

Other variations can be provided with the embodiments described hereinabove, e.g., a filter (not shown in the drawings) can be provided near the fan 302 for filtering the air.

The foregoing description is provided for illustrative purposes only and should not be construed as any way limiting this invention, the scope of which is defined solely by the appended claims.

The invention claimed is:

1. A decorative humidifier including mainly:
a base seat,
a water receptacle connected with the base seat
a device for transforming water into vapor,
a fan installed under the base seat,
an air guide tube provided on the base seat,
a vapor guide tube provided in the water receptacle,
a vapor exit on top of the vapor guide tube,
a water opening on the bottom of the water receptacle,
a power source provided above the fan,
an air opening provided on the air guide tube, and
a shaft connected with the power source.

2. The decorative humidifier of claim 1, further comprising a second fan.

3. The decorative humidifier of claim 1, further comprising at least a gear.

4. The decorative humidifier of claim 1, further comprising at least an elongate drive stub eccentrically fixed on a wheel.

5. The decorative humidifier of claim 1, further comprising at least a magnet.

6. The decorative humidifier of claim 1, further comprising at least a light.

7. The decorative humidifier of claim 3, further comprising at least an inner gear.

8. The decorative humidifier of claim 1, further comprising at least an arm.

9. The decorative humidifier of claim 1, further comprising an automatic safety device for the humidifier, which is installed at a sub-receptacle of water on the base seat, and which includes mainly a water separation tube, a sensing piece in the water separation tube, a magnetic float provided around the water separation tube, and a fixed head.

10. The decorative humidifier of claim 1, further comprising at least a wheel.

11. The decorative humidifier of claim 1, further comprising at least an ozone mechanism.

12. The decorative humidifier of claim 2, further comprising at least a second shaft.

13. The decorative humidifier of claim 2, further comprising at least a gear.

14. The decorative humidifier of claim 2, further comprising at least an elongate drive stub eccentrically fixed on a wheel.

15. The decorative humidifier of claim 2, further comprising at least a magnet.

16. The decorative humidifier of claim 1, further comprising at least a coil and a magnet.

17. A decorative humidifier including mainly:
a base seat,
a water receptacle connected with the base seat,
a device for transforming water into vapor,
a fan installed under the base seat,
a water opening on the bottom of the water receptacle,
a power source provided above the fan,
a shaft connected with the power source, and
an air filtering device provided near the fan.

* * * * *